(12) United States Patent
Vemula (10) Patent No.: US 10,152,448 B2
(45) Date of Patent: Dec. 11, 2018

(54) RESISTOR MODULE OF A USB INTERFACE DEVICE AND A METHOD OF OPERATING A RESISTOR MODULE OF A USB INTERFACE DEVICE

(71) Applicant: NXP B.V., Eindhoven (NL)

(72) Inventor: Madan Mohan Reddy Vemula, Tempe, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/364,014

(22) Filed: Nov. 29, 2016

(65) Prior Publication Data

US 2018/0152183 A1 May 31, 2018

(51) Int. Cl.
*G06F 13/42* (2006.01)
*H02J 7/00* (2006.01)
*G06F 13/40* (2006.01)

(52) U.S. Cl.
CPC ...... *G06F 13/4282* (2013.01); *G06F 13/4068* (2013.01); *H02J 7/0052* (2013.01); *H02J 2007/0062* (2013.01)

(58) Field of Classification Search
CPC ............ H02J 2007/0062; H02J 7/0052; G06F 13/4068
See application file for complete search history.

(56) References Cited

U.S. PATENT DOCUMENTS

| | | | | |
|---|---|---|---|---|
| 2005/0228934 A1* | 10/2005 | Tsutsui | ................ | G06F 13/4077 710/313 |
| 2008/0204083 A1* | 8/2008 | Kunc | ................... | H03K 5/2481 327/63 |
| 2008/0309313 A1* | 12/2008 | Farrar | ..................... | G06F 1/266 323/351 |
| 2014/0019817 A1* | 1/2014 | Park | ....................... | G06F 11/221 714/712 |
| 2014/0117784 A1* | 5/2014 | Weissinger, Jr. | ...... | H02J 7/0026 307/150 |
| 2014/0354080 A1* | 12/2014 | Sung | ........................ | H02J 4/00 307/125 |
| 2015/0261714 A1* | 9/2015 | Talmola | .............. | G06F 13/4081 710/313 |
| 2015/0277527 A1* | 10/2015 | Liu | ........................ | G06F 1/266 713/300 |
| 2015/0293514 A1* | 10/2015 | Tupala | .................... | G06F 1/266 700/295 |
| 2015/0349509 A1* | 12/2015 | Hingorani | ................ | H02H 1/06 361/56 |

(Continued)

*Primary Examiner* — Thomas J Hiltunen (57) ABSTRACT

Embodiments of a resistor module of a USB interface device and a method for operating a resistor module of a USB interface device are described. In an embodiment, a resistor module of a USB interface device includes a pull-down resistor connectable to a USB power-sourcing device, a switch connected between the pull-down resistor and a fixed reference voltage, an energy storage unit connectable to the USB power-sourcing device and configured to store electrical energy in response to a current from the USB power-sourcing device, a switch control unit connected to the energy storage unit and configured to control the switch with a control signal in response to a voltage of the energy storage unit, and a glitch filter connected to the switch and to the switch control unit and configured to remove a glitch in the control signal. Other embodiments are also described.

19 Claims, 7 Drawing Sheets

(56) References Cited

U.S. PATENT DOCUMENTS

| | | | |
|---|---|---|---|
| 2016/0268815 A1* | 9/2016 | Lee | H02J 50/10 |
| 2017/0070010 A1* | 3/2017 | Zupke | H03K 3/3565 |
| 2017/0261214 A1* | 9/2017 | Lai | F24D 19/10 |

* cited by examiner

RESISTOR MODULE OF A USB INTERFACE DEVICE AND A METHOD OF OPERATING A RESISTOR MODULE OF A USB INTERFACE DEVICE

BACKGROUND

Bus interface protocols can be used to provide power over wired interfaces. For example, bus interface protocols can be used to provide power to charge a battery and/or directly power a power-consuming device. A particular type of bus interface protocol is the Universal Serial Bus (USB). USB can be used, for example, to attach external peripherals to host devices, to interface between peripherals, to charge devices, and for other applications. USB provides various different data transfer speeds, charging modes, and power providing and sinking capabilities. USB Type-C technology can be used to provide power as well as high speed data connectivity. The USB Type-C specification defines a 24-pin fully reversible-plug USB Type-C connector for USB devices and USB cabling. For example, USB Type-C compliant connectors can support 5V with 500 mA/900 mA (for USB 2.0/USB 3.1), 1.5 A and 3 A modes.

USB Type-C technology uses pull-down resistors for power delivery purposes. For example, once a USB host detects a pull-down resistor at a USB Type-C compliant connector, the USB host can apply a predefined voltage through the USB Type-C compliant connector. After the predefined voltage is applied through the USB Type-C compliant connector, the pull-down resistor is disabled to reduce power consumption. A typical pull-down resistor uses a 0V threshold semiconductor device to maintain the voltage on the pull-down resistor and to disable the pull-down resistor to reduce power consumption. However, a 0V threshold semiconductor device can be costly to manufacture, and therefore, can increase the component cost of a corresponding pull-down resistor.

SUMMARY

Embodiments of a resistor module of a USB interface device and a method for operating a resistor module of a USB interface device are described. In an embodiment, a resistor module of a USB interface device includes a pull-down resistor connectable to a USB power-sourcing device, a switch connected between the pull-down resistor and a fixed reference voltage, an energy storage unit connectable to the USB power-sourcing device and configured to store electrical energy in response to a current from the USB power-sourcing device, a switch control unit connected to the energy storage unit and configured to control the switch with a control signal in response to a voltage of the energy storage unit, and a glitch filter connected to the switch and to the switch control unit and configured to remove a glitch in the control signal. Other embodiments are also described.

In an embodiment, the USB interface device includes a USB Type-C compliant interface device.

In an embodiment, the switch control unit is configured to compare the voltage of the energy storage unit with a voltage threshold and to switch on or off the switch in response to a comparison result between the voltage of the energy storage unit and the voltage threshold.

In an embodiment, the switch control unit is configured to switch on the switch if the voltage of the energy storage unit is higher than the voltage threshold and to switch off the switch if the voltage of the energy storage unit is lower than the voltage threshold.

In an embodiment, the switch control unit includes a first voltage source having a second fixed reference voltage and a voltage comparator configured to compared the second fixed reference voltage with the voltage of the energy storage unit.

In an embodiment, the switch control unit includes serially connected semiconductor switches connected between the energy storage unit and the fixed reference voltage.

In an embodiment, the switch control unit includes a current mirror circuit having a first set of semiconductor switches of a first type and a second set of semiconductor switches of a second type.

In an embodiment, the pull-down resistor is connected to the fixed reference voltage when the switch is switched on, and the pull-down resistor is disconnected from the fixed reference voltage when the switch is switched off.

In an embodiment, the pull-down resistor and the energy storage unit are connectable to a configuration channel (CC) port of the USB power-sourcing device.

In an embodiment, the energy storage unit includes semiconductor switch and a capacitor. The semiconductor switch is connectable to a CC port of the USB power-sourcing device and is configured to store electrical energy in the capacitor in response to the current from the USB power-sourcing device.

In an embodiment, the pull-down resistor includes one of a passive pull-down resistor, an active pull-down resistor, or a combination of the passive pull-down resistor and the active pull-down resistor.

In an embodiment, the glitch filter includes a delay element configured to generate a delayed version of the control signal.

In an embodiment, the USB interface device is connectable to a USB device in a dead battery condition, and the current is applied to the resistor module and a voltage at the resistor module is detected before power is provided to the USB device.

In an embodiment, a resistor module of a USB cable includes a pull-down resistor connectable to a USB host, a switch connected between the pull-down resistor and a fixed reference voltage, an energy storage unit connectable to the USB host and configured to store electrical energy in response to a current from the USB host, a switch control unit connected to the energy storage unit and configured to control the switch with a control signal in response to a voltage of the energy storage unit by comparing the voltage of the energy storage unit with a voltage threshold and switching on or off the switch in response to a comparison result between the voltage of the energy storage unit and the voltage threshold, and a glitch filter connected to the switch and to the switch control unit and configured to remove a glitch in the control signal.

In an embodiment, the USB cable includes a USB Type-C compliant cable.

In an embodiment, the switch control unit is configured to turn on the switch if the voltage of the energy storage unit is higher than the voltage threshold and to turn off the switch if the voltage of the energy storage unit is lower than the voltage threshold. The pull-down resistor is connected to the fixed reference voltage when the switch is turned on, and the pull-down resistor is disconnected from the fixed reference voltage when the switch is turned off to reduce power dissipation on the resistor module.

In an embodiment, the switch control unit includes at least one of a first voltage source having a second fixed reference voltage and a voltage comparator configured to compared the second fixed reference voltage with the voltage of the energy storage unit, serially connected semiconductor switches connected between the energy storage unit and the fixed reference voltage, and a current mirror circuit comprised of a first set of semiconductor switches of a first type and a second set of semiconductor switches of a second type.

In an embodiment, the USB cable is connectable to a USB device in a dead battery condition. The current is applied to the resistor module and a voltage at the resistor module is detected by the USB host before power is provided to the USB device.

In an embodiment, a method for operating a resistor module of a USB interface device involves storing electrical energy in response to a current from a USB power-sourcing device, controlling a switch connected between a pull-down resistor connected to the USB power-sourcing device and a fixed reference voltage with a control signal in response to a voltage of the stored electrical energy, and removing a glitch in the control signal.

In an embodiment, the USB interface device includes a USB Type-C compliant interface device.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
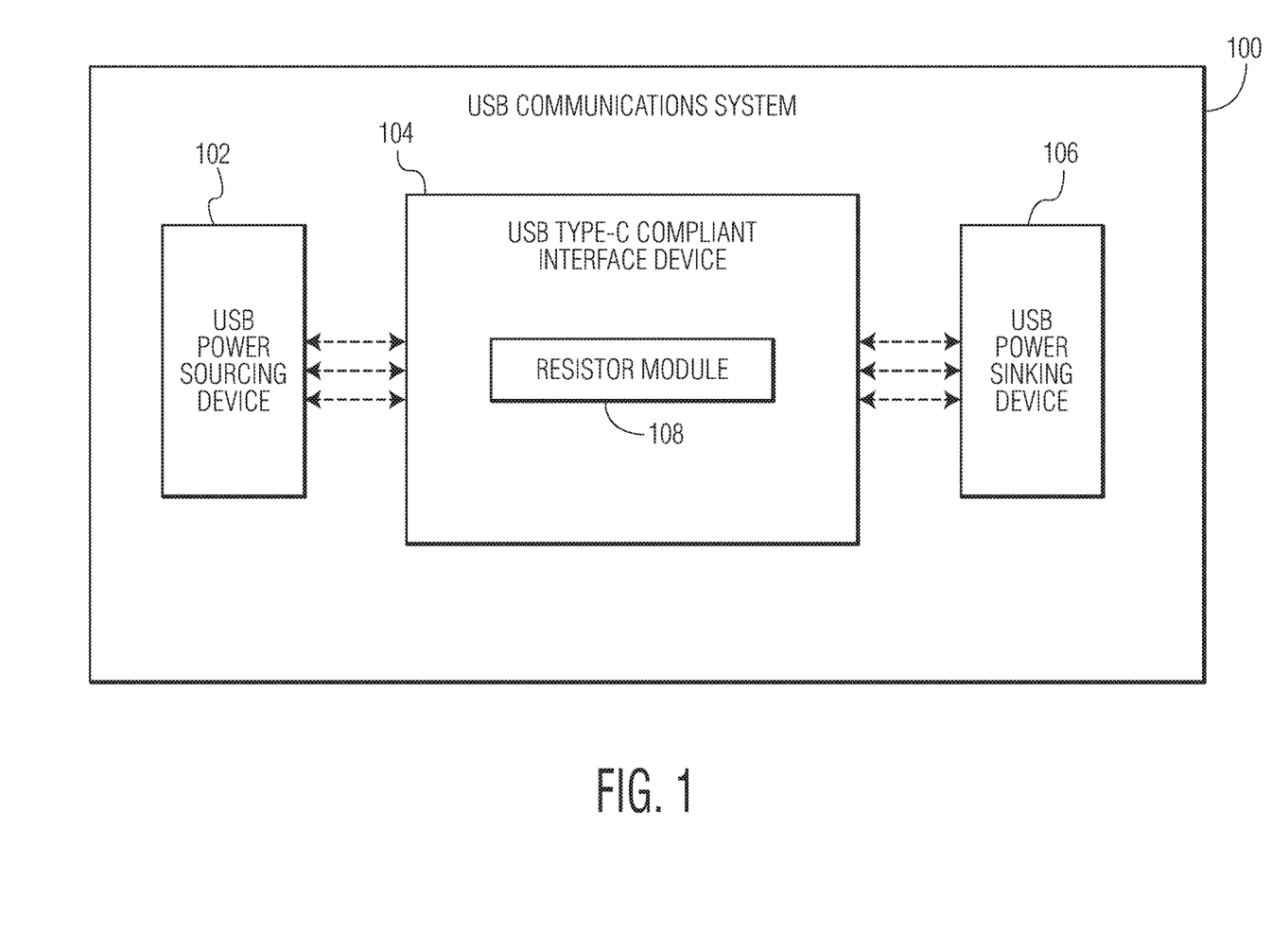
FIG. 1 is a functional block diagram of a USB communications system in accordance with an embodiment of the invention.

FIG. 1 is a functional block diagram of a USB communications system 100 in accordance with an embodiment of the invention. In the embodiment depicted in FIG. 1, the USB communications system includes a USB power-sourcing device 102, a USB Type-C compliant interface device 104, and a USB power-sinking device 106. Although the illustrated USB communications system is shown with certain components and described with certain functionality herein, other embodiments of the USB communications system may include fewer or more components to implement the same, less, or more functionality. Although the USB communications system 100 in the embodiment depicted in FIG. 1 includes the USB Type-C compliant interface device 104, in other embodiments, the USB communications system 100 includes a USB interface device of other type (e.g., USB Type-A, USB Mini Type-A, USB Micro Type-A, USB Type-B, USB Mini Type-B, or USB Micro Type-B).

In the embodiment depicted in FIG. 1, the USB power-sourcing device 102 is configured to provide power to the USB power-sinking device 106 through the USB Type-C compliant interface device 104. The power from the USB power-sourcing device can be provided over one or more wires. For instance, the wires may be part of a USB Type-C compliant cable. The USB power-sourcing device may be a USB host. Examples of the USB power-sourcing device include, without being limited to, computers, power bricks, smart phones, and tablets.

The USB Type-C compliant interface device 104 of the USB communications system 100 is connectable to the USB power-sourcing device 102 and/or to the USB power-sinking device 106. In some embodiments, the USB Type-C compliant interface device is a USB Type-C compliant cable. For example, the USB Type-C compliant interface device may be a USB Type-C compliant cable having at least one USB Type-C compliant connector. In the embodiment depicted in FIG. 1, the USB Type-C compliant interface device includes at least one resistor module 108 used as a pull-down resistor module for the USB power-sourcing device. For example, once the USB power-sourcing device is connected to the USB Type-C compliant interface device and detects the resistor module, the USB Type-C host can apply a predefined voltage to the USB Type-C compliant interface device. After the predefined voltage is applied through the USB Type-C compliant interface device, the resistor module is disabled to reduce power consumption. Compared to a typical pull-down resistor that uses a 0V threshold semiconductor device to maintain the voltage on the pull-down resistor and to disable the pull-down resistor to reduce power consumption, the resistor module depicted in FIG. 1 harvests energy from a current from the USB power-sourcing device and switches off a pull-down resistance based on the harvested energy. Therefore, a 0V threshold semiconductor device may no longer be needed in the resistor module. Consequently, the component cost of the resistor module and the USB Type-C compliant interface device can be reduced. It should be noted that the technology described herein is not limited to USB Type-C. In some embodiments, instead of the USB Type-C compliant interface device 104, the USB communications system 100 includes a USB interface device of other type (e.g., USB Type-A, USB Mini Type-A, USB Micro Type-A, USB Type-B, USB Mini Type-B, or USB Micro Type-B).

In the embodiment depicted in FIG. 1, the USB power-sinking device 106 is configured to receive power from the USB power-sourcing device 102 through the USB Type-C compliant interface device 104. The USB power-sourcing device may be a USB device. In some embodiments, the USB power-sinking device includes a voltage circuit configured to detect a voltage that is provided over the USB Type-C compliant interface device.

Figure 2:
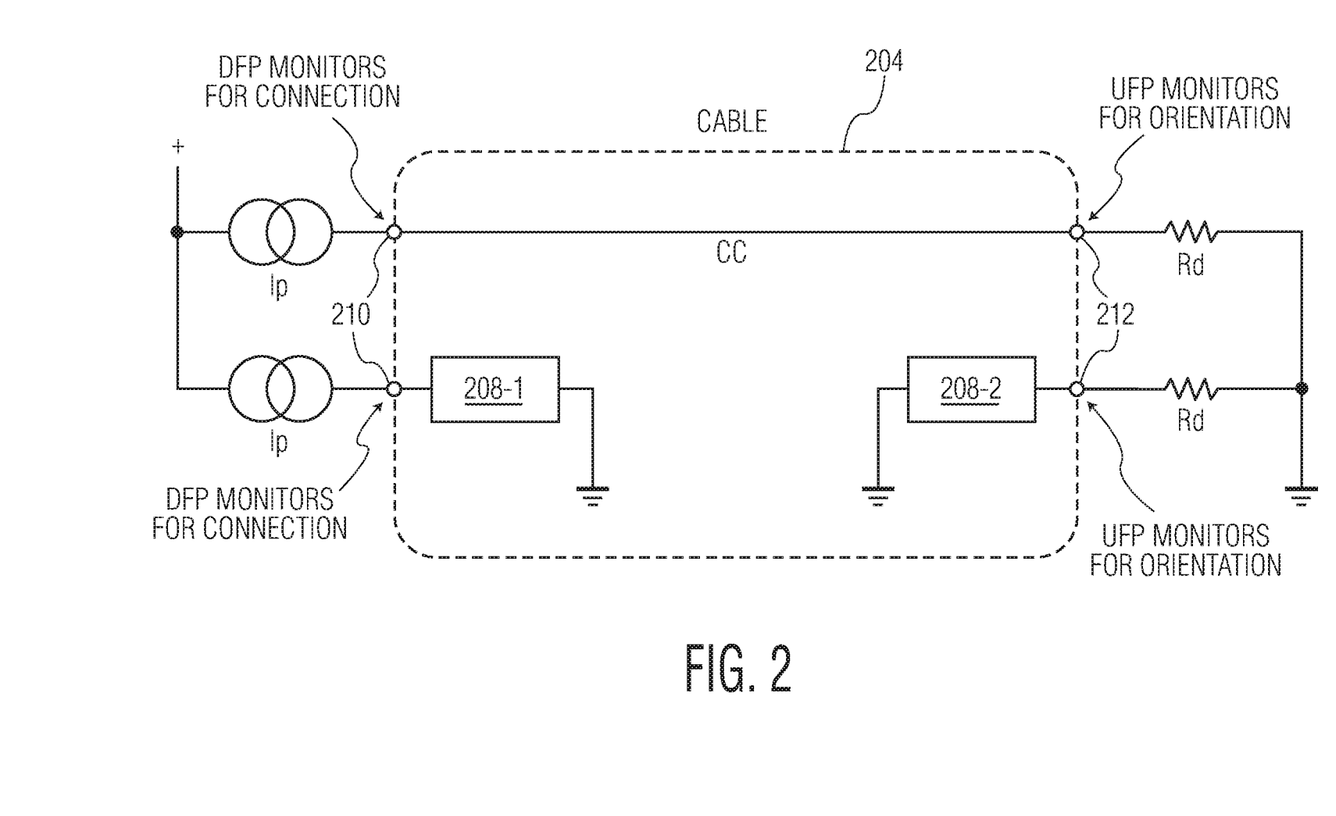
FIG. 2 depicts a current source/pull-down configuration channel (CC) model for the USB communications system depicted in FIG. 1.

FIG. 2 depicts a current source/pull-down configuration channel (CC) model for the USB communications system 100 depicted in FIG. 1. As depicted in FIG. 2, Downstream Facing Port (DFP) 210 is monitored for potential connection with a USB Type-C compliant cable 204 by the USB power-sourcing device 102 (e.g., a USB host). Upstream Facing Port (UFP) 212 is monitored for potential connection with the USB Type-C compliant cable by the USB power-sinking device 106 (e.g., a USB device). Current sources, "Ip," (e.g., generated by pull-up resistors) are presented on pins of the DFP. Pull-down resistors, "Rd," are presented on pins of the UFP. In the embodiment depicted in FIG. 2, the USB Type-C compliant cable includes two resistor modules 208-1 and 208-2 that are used as pull-down resistor modules. The USB Type-C compliant cable 204 depicted in FIG. 2 is an embodiment of the USB Type-C compliant interface device 104 depicted in FIG. 1. The resistor modules 208-1 and 208-2 depicted in FIG. 2 are embodiments of the resistor module 108 depicted in FIG. 1.

Figure 3:
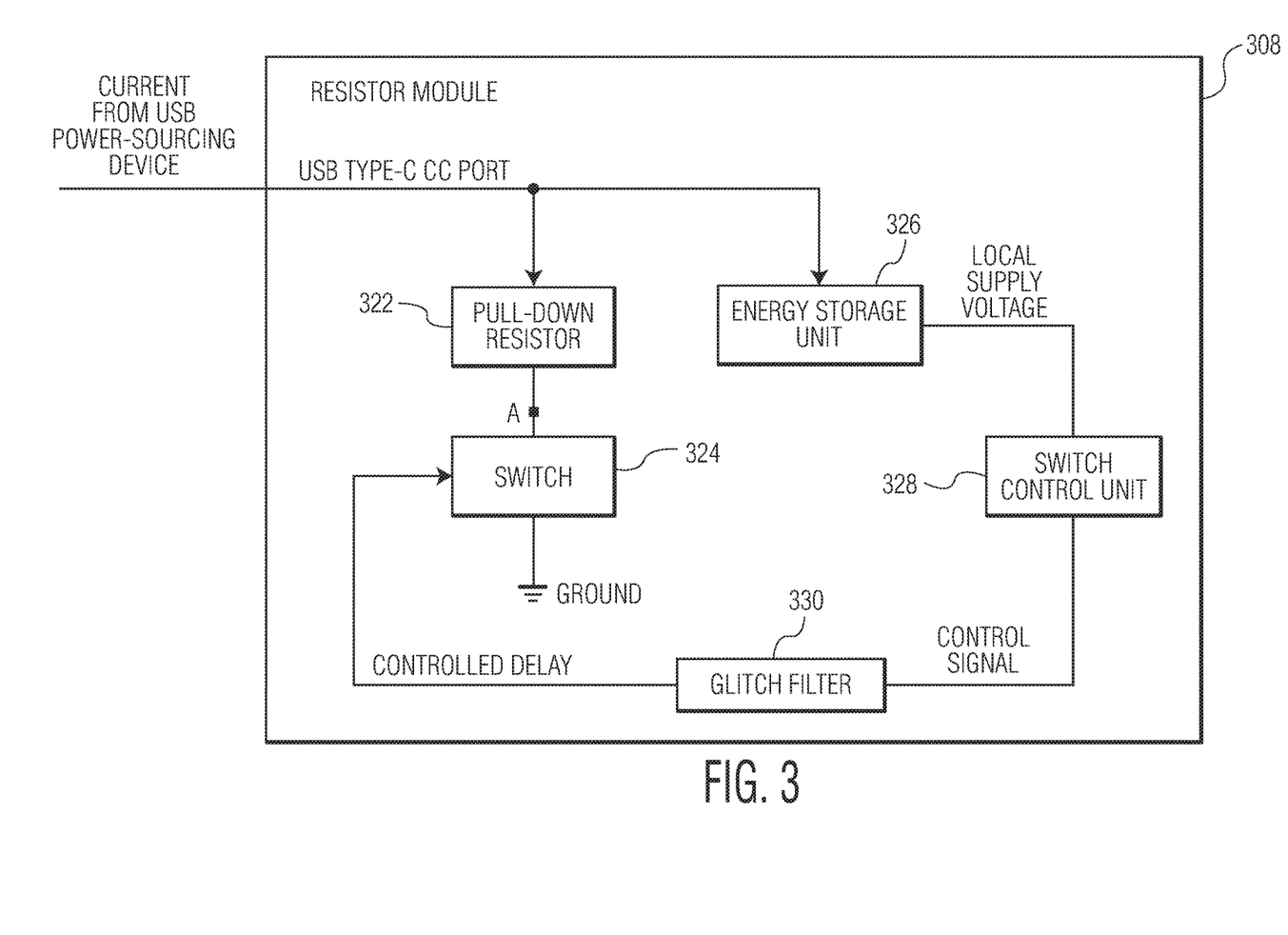
FIG. 3 depicts an embodiment of a resistor module of a USB Type-C compliant interface device of the USB communications system depicted in FIG. 1.

FIG. 3 depicts an embodiment of the resistor module 108 of the USB Type-C compliant interface device 104 depicted in FIG. 1. In the embodiment depicted in FIG. 3, a resistor module 308 includes a pull-down resistor 322, a switch 324, an energy storage unit 326, a switch control unit 328, and a glitch filter 330. The resistor module may be an integrated circuit (IC) device or part of an IC device that includes additional components. For example, the resistor module may be integrated/implemented on an IC chip. The resistor module 308 depicted in FIG. 3 is one possible embodiment of the resistor module 108 depicted in FIG. 1. However, the resistor module 108 depicted in FIG. 1 is not limited to the embodiment shown in FIG. 3. For example, in some embodiments, the resistor module includes a voltage detection unit configured to detect a minimum voltage to turn on the switch 324.

In the embodiment depicted in FIG. 3, the pull-down resistor 322 is connectable to the USB power-sourcing device 102 (e.g., a USB host) through one or more USB Type-C configuration channel (CC) ports. In some embodiments, the pull-down resistor is an active pull-down resistor, such as a MOSFET-based resistor or a bipolar-based resistor. In some embodiments, the pull-down resistor is a passive pull-down resistor. In some embodiments, the pull-down resistor is a combination of a passive pull-down resistor and an active pull-down resistor. The resistance value of the pull-down resistor can be set to, for example, 1 k ohms or other suitable values.

In the embodiment depicted in FIG. 3, the switch 324 is connected between the pull-down resistor 322 and a fixed reference voltage, such as ground. Other reference voltages are also possible. The switch can be switched on by the switch control unit 328 with a positive voltage (e.g., 1V, 5V, or other suitable voltages). Consequently, the switch may not be implemented as a 0V threshold semiconductor device, and, the component cost of the resistor module and the USB Type-C compliant interface device 104 can be reduced. In some embodiments, the pull-down resistor is connected to the fixed reference voltage when the switch is switched/turned on, and the pull-down resistor is disconnected from the fixed reference voltage when the switch is switched/turned off to reduce the power dissipation on the resistor module. In some embodiments, when the switch is switched on, the switch has an ON resistance from a few ohms to a few hundred ohms relative to the ground such that the combination of the ON resistance of the switch and the resistance of the pull-down resistor forms a pull-down resistance compliant with the USB Type-C specification. In these embodiments, when the switch is switched off, the switch has a large impedance (e.g., greater than 1 Megaohms (MΩ) impedance) from node A to the ground such that the power consumption of the pull-down resistor and the switch can be reduced.

In the embodiment depicted in FIG. 3, the energy storage unit 326 is connectable to the USB power-sourcing device 102 and configured to store electrical energy in response to a current from the USB power-sourcing device. In some embodiments, the energy storage unit receives a current from the USB power-sourcing device (e.g., through a USB Type-C CC port) and stores energy onto a capacitor or other energy storage element. The stored charge/voltage in the energy storage unit (e.g., by the capacitor or other energy storage element) is referred to as the local supply voltage. In some embodiments, the energy storage unit stores energy from a USB Type-C CC port but does not leak energy back into the USB Type-C CC port when the local supply voltage is greater than the voltage at the USB Type-C CC port.

In the embodiment depicted in FIG. 3, the switch control unit 328 is connected to the energy storage unit 326 and is configured to control the switch with a control signal in response to a voltage of the energy storage unit. In some embodiments, the switch control unit includes a voltage comparator circuit configured to compare the local supply voltage with a predetermined voltage threshold. If the local supply voltage is higher than the predetermined voltage threshold, the voltage comparator circuit outputs a positive control signal (e.g., Control=1) to switch on the switch 324. If the local supply voltage is lower than the predetermined voltage threshold, the voltage comparator circuit outputs a negative control signal (e.g., Control=0) to switch off the switch 324. In some embodiments, the switch control unit includes a first voltage source having a second fixed reference voltage and a voltage comparator configured to compared the second fixed reference voltage with the voltage of the energy storage unit. In some embodiments, the switch control unit includes serially connected semiconductor switches connected between the energy storage unit and the fixed reference voltage. In some embodiments, the switch control unit includes a current mirror circuit that includes a first set of semiconductor switches of a first type and a second set of semiconductor switches of a second type.

In the embodiment depicted in FIG. 3, the glitch filter 330 is connected to the switch 324 and to the switch control unit 328 and is configured to remove a glitch (e.g., an unexpected spike or dip in signal level) in the control signal from the switch control unit 328. In some embodiments, the glitch filter is configured to remove glitches from a voltage comparison output signal that is generated by the switch control unit or from an unexpected spike or dip in the power supply voltage level. In some embodiments, the glitch filter is implemented as a delay element.

In some embodiments, the resistor module 308 can operate under a dead battery condition in which a USB host (e.g., the USB power-sourcing device 102) provides power to a USB device (e.g., the USB power-sinking device 106) that does not have power (e.g., dead battery). For example, the USB power-sourcing device provides a current to the resistor module and detects a voltage on the resistor module before providing power to the USB power-sinking device that is connected to the USB Type-C compliant interface device 104.

In an example operation of the resistor module 308 depicted in FIG. 3, the resistor module harvests energy from a current from the USB power-sourcing device 102 and switches on or off the pull-down resistor 322 based on the harvested energy. Specifically, the energy storage unit 326 stores electrical energy in response to a current from the USB power-sourcing device. The switch control unit 328 controls the switch 324 connected between the pull-down resistor and the ground with a control signal in response to a voltage of the energy storage unit. The glitch filter 330 removes a glitch in the control signal. When the switch is switched on, the pull-down resistor is connected to ground. The USB power-sourcing device detects the pull-down resistor (e.g., by detecting that the voltage of the pull-down resistor is lower than the USB active switch threshold voltage) and starts to provide power to the USB power-sinking device 106 through the USB Type-C compliant interface device 104. After power is provided to the USB power-sinking device from the USB power-sourcing device, the switch is switched off and the pull-down resistor is disconnected from ground such that the power consumption of the resistor module can be reduced.

Figure 4:
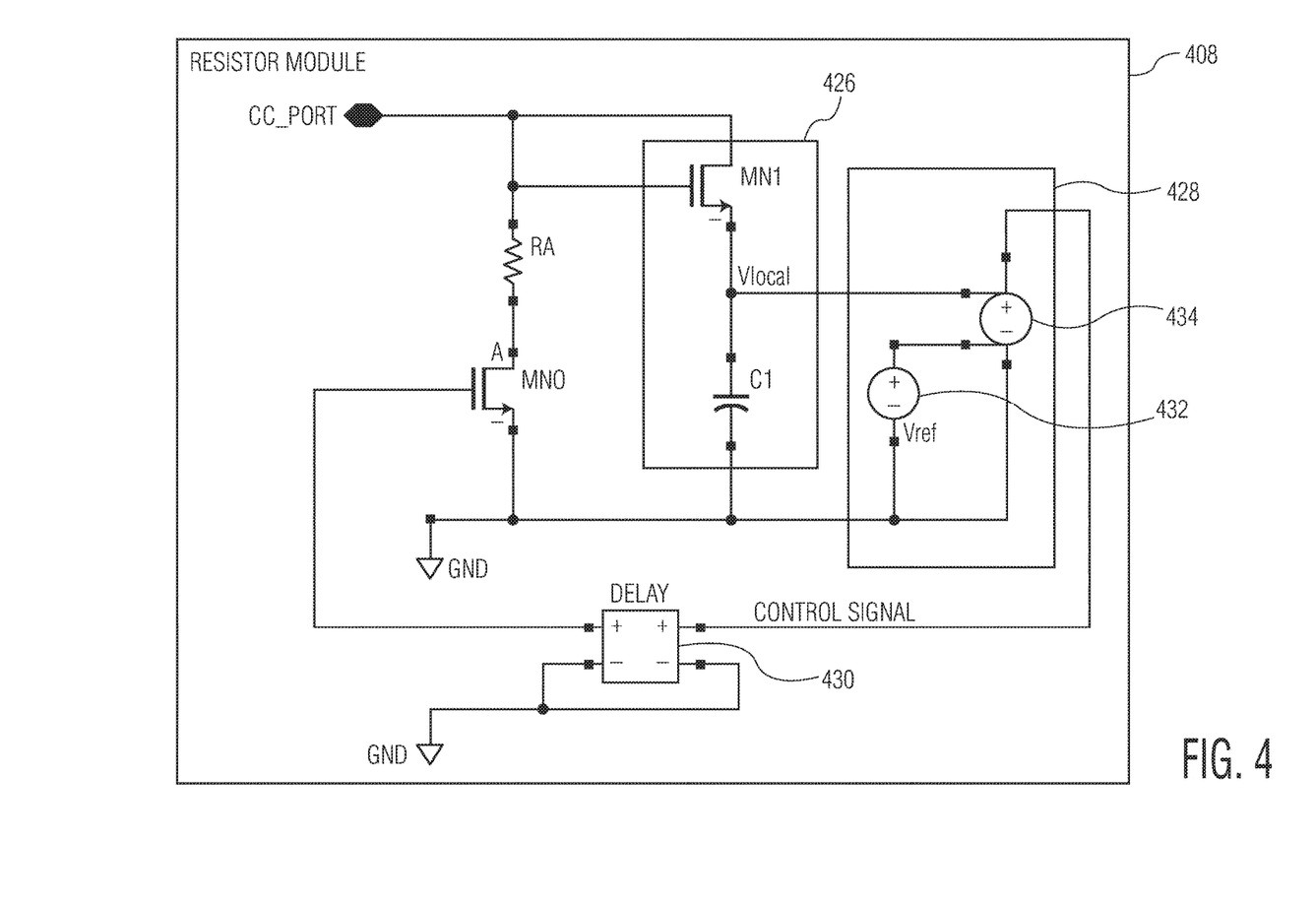
FIG. 4 depicts an embodiment of the resistor module depicted in FIG. 3.

FIG. 4 depicts an embodiment of the resistor module 308 depicted in FIG. 3. In the embodiment depicted in FIG. 4, a resistor module 408 includes a pull-down resistor, "Ra," an NMOS transistor, "MN0," an energy storage unit 426 that includes a source follower NMOS transistor, "MN1," and a capacitor, "C1," a switch control unit 428 that includes a voltage source 432 with a fixed reference voltage, "Vref," and a voltage source 434 acts as a voltage comparator, and a glitch filter 430 that is implemented as a delay element. The source follower NMOS transistor, MN1, may be a 5V NMOS transistor. The source follower NMOS transistor, MN1, receives a current from the USB power-sourcing device 102 through the USB Type-C CC port, "CC_PORT," and stores the received energy onto the capacitor, C1. The stored charge/voltage on the capacitor, C1, is referred to as the local supply voltage, Vlocal. The voltage source 434 stores the local supply voltage, Vlocal, which is compared with the reference voltage, Vref, of the voltage source 432 to generate a control signal for the NMOS transistor, MN0. The resistor module 408 depicted in FIG. 4 is one possible embodiment of the resistor module 308 depicted in FIG. 3. In particular, the pull-down resistor, Ra, depicted in FIG. 4 is an embodiment of the pull-down resistor 322 depicted in FIG. 3, the NMOS transistor, MN0, depicted in FIG. 4 is an embodiment of the switch 324 depicted in FIG. 3, the energy storage unit 426 depicted in FIG. 4 is an embodiment of the energy storage unit 326 depicted in FIG. 3, the switch control unit 428 depicted in FIG. 4 is an embodiment of the switch control unit 328 depicted in FIG. 3, and the delay element 430 depicted in FIG. 4 is an embodiment of the glitch filter 330 depicted in FIG. 3. However, the resistor module 308 depicted in FIG. 3 is not limited to the embodiment shown in FIG. 4.

In an example operation of the resistor module 408 depicted in FIG. 4, the source follower NMOS transistor, MN1, stores the electrical charge from the USB power-sourcing device 102 through the USB Type-C CC port, "CC_PORT," onto the capacitor, C1. When the voltage on the capacitor, C1, reaches a certain voltage threshold (e.g., larger than Vref), the NMOS transistor, MN0, is enabled, which keeps the voltage of the pull-down resistor, Ra, around the source current multiplied by the resistance of the pull-down resistor, Ra. For example, a 80 µA current from the USB power-sourcing device and a resistance of 1 k ohms, the voltage of the pull-down resistor, Ra, is 80 mV, which is below the USB active switch threshold voltage (150 mV) as defined in the USB type-C specification. The USB power-sourcing device detects the pull-down resistor, Ra, (e.g., by detecting that the voltage of the pull-down resistor is lower than the USB active switch threshold voltage) and starts to provide power to the USB power-sinking device 106 through the USB Type-C compliant interface device 104. The voltage stored in the capacitor, C1, has no leakage path and hence the NMOS transistor, MN0, remains enabled until power is supplied from the USB power-sourcing device 102 (e.g., through VCONN pin). After power is provided to the USB power-sinking device from the USB power-sourcing device, the voltage stored in the capacitor, C1, decreases to a level that is below a voltage threshold (e.g., lower than Vref). Consequently, the NMOS transistor, MN0, is disabled/switched off and the pull-down resistor, Ra, is disconnected from ground such that the power consumption of the resistor module is reduced.

Figure 5:
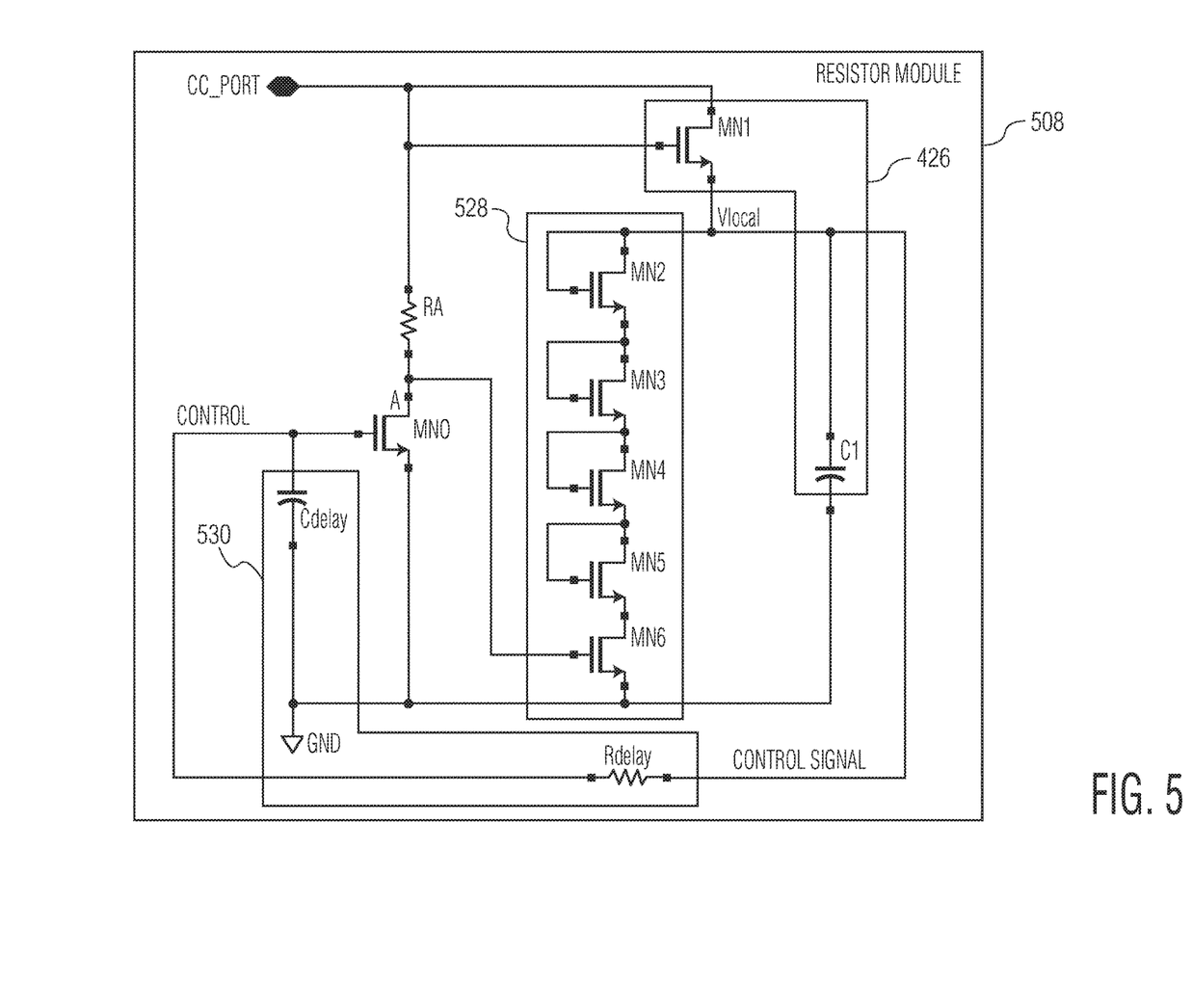
FIG. 5 depicts another embodiment of the resistor module depicted in FIG. 3.

FIG. 5 depicts another embodiment of the resistor module 308 depicted in FIG. 3. In the embodiment depicted in FIG. 5, a resistor module 508 includes the pull-down resistor, "Ra," the NMOS transistor, MN0, the energy storage unit 426 that includes the source follower NMOS transistor, MN1, and the capacitor, C1, a switch control unit 528 that includes NMOS transistors, "MN2"-"MN6," and a glitch filter/delay element 530 that includes a resistor, "Rdelay," and a capacitor, "Cdelay." The source follower NMOS transistor, MN1, receives a current from a USB Type-C CC port, "CC_PORT," and stores the received energy onto the capacitor, C1. The stored charge/voltage on the capacitor, C1, is referred to as the local supply voltage, Vlocal. The NMOS transistors, MN2, MN3, MN4, MN5, MN6, compare the local supply voltage, Vlocal, with a voltage threshold to generate a control signal for the NMOS transistor, MN0. The resistor module 508 depicted in FIG. 5 is one possible embodiment of the resistor module 308 depicted in FIG. 3.

In particular, the pull-down resistor, Ra, depicted in FIG. 5 is an embodiment of the pull-down resistor 322 depicted in FIG. 3, the NMOS transistor, MN0, depicted in FIG. 5 is an embodiment of the switch 324 depicted in FIG. 3, the energy storage unit 426 depicted in FIG. 5 is an embodiment of the energy storage unit 326 depicted in FIG. 3, the switch control unit 528 depicted in FIG. 5 is an embodiment of the switch control unit 328 depicted in FIG. 3, and the delay element 530 depicted in FIG. 5 is an embodiment of the glitch filter 330 depicted in FIG. 3. However, the resistor module 308 depicted in FIG. 3 is not limited to the embodiment shown in FIG. 5.

Figure 6:
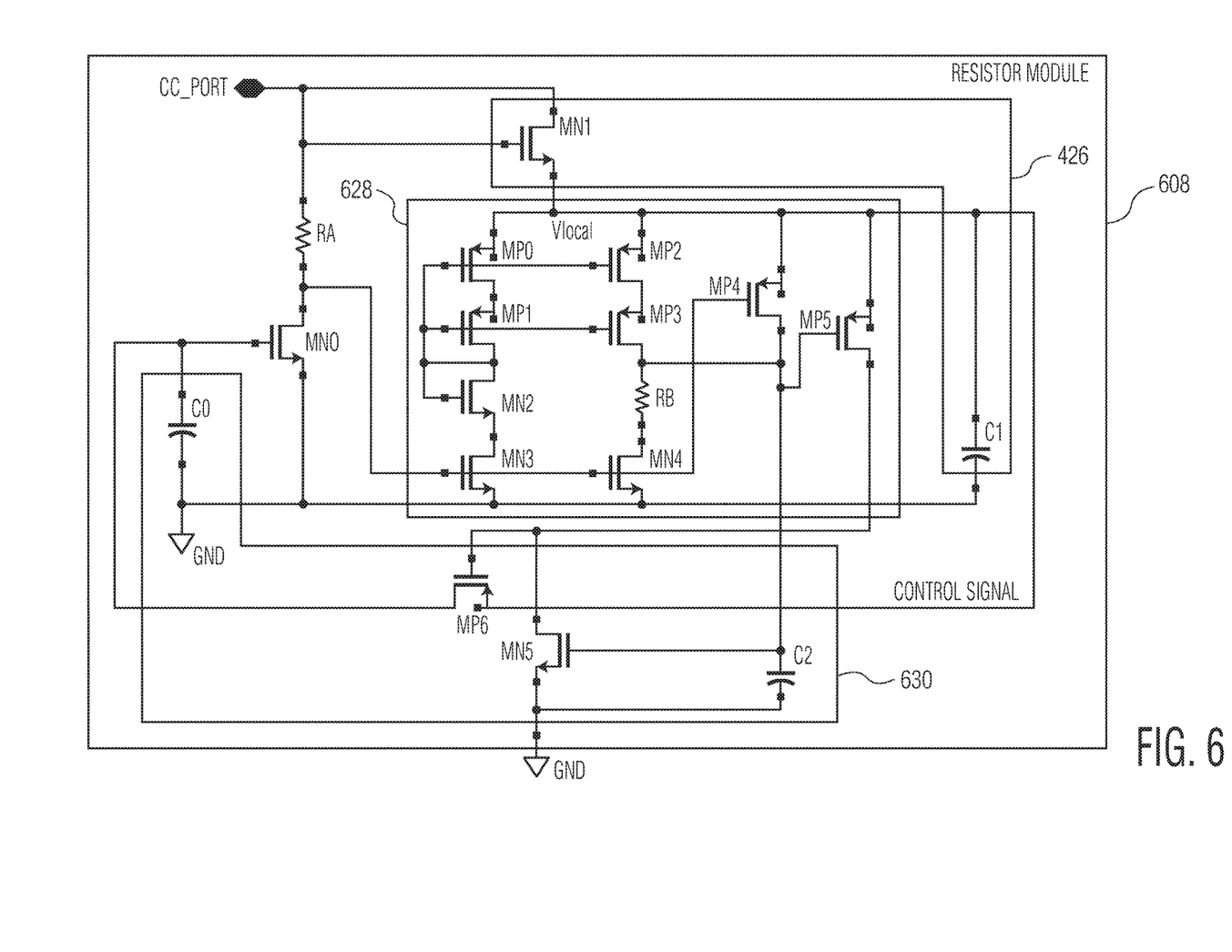
FIG. 6 depicts another embodiment of the resistor module depicted in FIG. 3.

FIG. 6 depicts another embodiment of the resistor module 308 depicted in FIG. 3. In the embodiment depicted in FIG. 6, a resistor module 608 includes the pull-down resistor, "Ra," the NMOS transistor, MN0, the energy storage unit 426 that includes the source follower NMOS transistor, MN1, and the capacitor, C1, a switch control unit 628 that includes NMOS transistors, "MN2"-"MN4," PMOS transistors, "MP0"-"MP5," and a resistor, "Rb," and a glitch filter/delay element 630 that includes an NMOS transistor, "MN5," a PMOS transistor, "MP6," and capacitors, "C0," "C2." The source follower NMOS transistor, MN1, receives a current from a USB Type-C CC port, "CC_PORT," and stores the received energy onto the capacitor, C1. The stored charge/voltage on the capacitor, C1, is referred to as the local supply voltage, Vlocal. The NMOS transistors, MN2, MN3, MN4 and PMOS transistors, MP0, MP1, MP2, MP3, MP4, MP5, which form a current mirror circuit, compare the local supply voltage, Vlocal, with a voltage threshold to generate a control signal for the NMOS transistor, MN0. The resistor module 608 depicted in FIG. 6 is one possible embodiment of the resistor module 308 depicted in FIG. 3. In particular, the pull-down resistor, Ra, depicted in FIG. 6 is an embodiment of the pull-down resistor 322 depicted in FIG. 3, the NMOS transistor, MN0, depicted in FIG. 6 is an embodiment of the switch 324 depicted in FIG. 3, the energy storage unit 426 depicted in FIG. 6 is an embodiment of the energy storage unit 326 depicted in FIG. 3, the switch control unit 628 depicted in FIG. 6 is an embodiment of the switch control unit 328 depicted in FIG. 3, and the delay element 630 depicted in FIG. 6 is an embodiment of the glitch filter 330 depicted in FIG. 3. However, the resistor module 308 depicted in FIG. 3 is not limited to the embodiment shown in FIG. 6.

Figure 7:
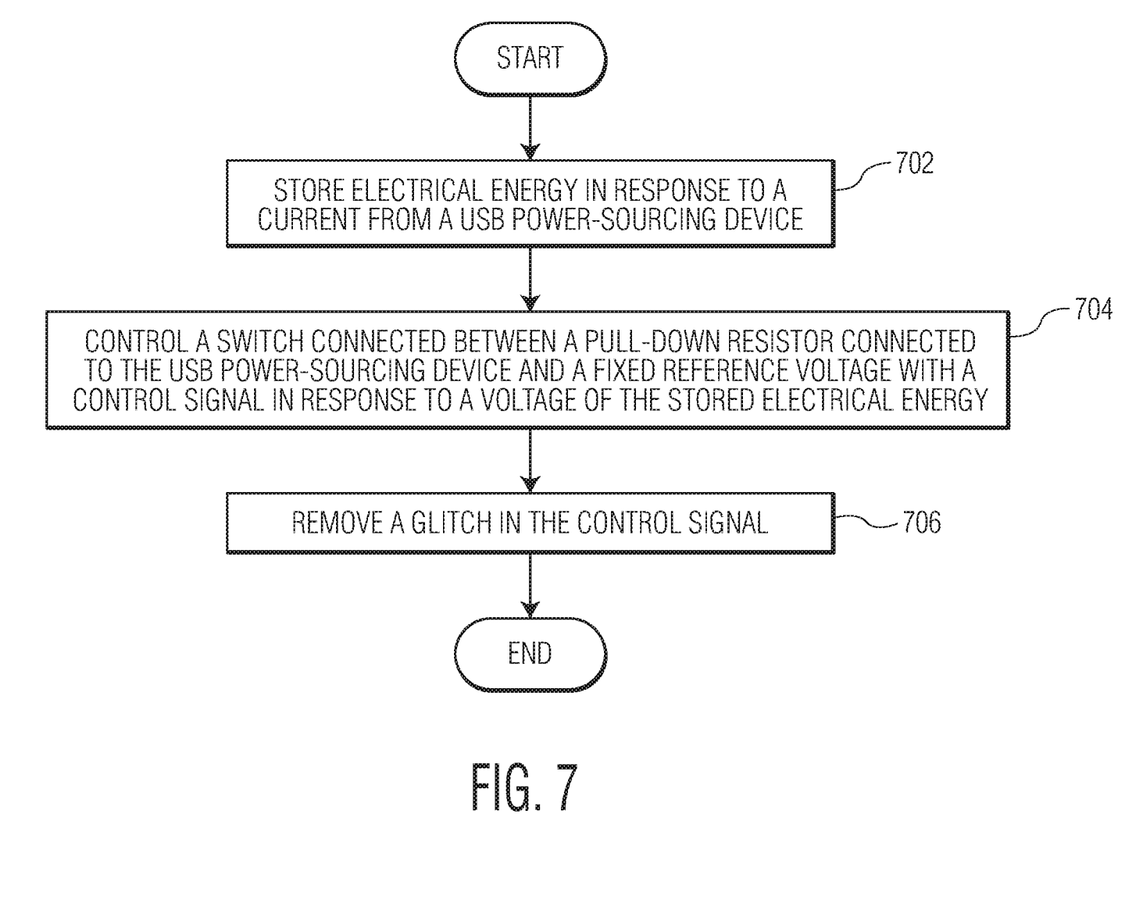
FIG. 7 is a process flow diagram of a method for operating a resistor module of a USB interface device in accordance with another embodiment of the invention.

FIG. 7 is a process flow diagram of a method for operating a resistor module of a USB interface device in accordance with an embodiment of the invention. At block 702, electrical energy is stored in response to a current from a USB power-sourcing device. At block 704, a switch connected between a pull-down resistor connected to the USB power-sourcing device and a fixed reference voltage is controlled with a control signal in response to a voltage of the stored electrical energy. At block 706, a glitch is removed in the control signal. The USB power-sourcing device may be the same or similar to the USB power-sourcing device 102 depicted in FIG. 1. The switch may be the same or similar to the switch 324 depicted in FIG. 1 and/or the NMOS transistor, MN0, depicted in FIGS. 4-6. The pull-down resistor may be the same or similar to the pull-down resistor 322 depicted in FIG. 3 and/or the pull-down resistor, Ra, depicted in FIGS. 4-6.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A resistor module of a Universal Serial Bus (USB) interface device, the resistor module comprising:
   a pull-down resistor connectable to a USB power-sourcing device;
   a switch connected between the pull-down resistor and a fixed reference voltage;
   an energy storage unit connectable to the USB power-sourcing device and configured to store electrical energy in response to a current from the USB power-sourcing device;
   a switch control unit connectable to the USB power-sourcing device through a semiconductor switch of the energy storage unit and configured to control the switch with a control signal in response to a voltage of the energy storage unit that is generated at a terming of the semiconductor switch; and
   a glitch filter connected to the switch and to the switch control unit and configured to remove a glitch in the control signal;
   wherein the switch control unit is configured to compare the voltage of the energy storage unit with a voltage threshold and to switch on or off the switch in response to a comparison result between the voltage of the energy storage unit and the voltage threshold.

2. The resistor module of claim 1,
   wherein the USB interface device comprises a USB Type-C compliant interface device.

3. The resistor module of claim 1:
   wherein the switch control unit is configured to switch on the switch if the voltage of the energy storage unit is higher than the voltage threshold and to switch off the switch if the voltage of the energy storage unit is lower than the voltage threshold.

4. The resistor module of claim 1,
wherein the switch control unit comprises a first voltage source having a second fixed reference voltage and a voltage comparator configured to compare the second fixed reference voltage with the voltage of the energy storage unit.

5. The resistor module of claim 1,
wherein the switch control unit comprises a plurality of serially connected semiconductor switches connected between the energy storage unit and the fixed reference voltage.

6. The resistor module of claim 1,
wherein the switch control unit comprises a current mirror circuit comprised of a first set of semiconductor switches of a first type and a second set of semiconductor switches of a second type.

7. The resistor module of claim 1,
wherein the pull-down resistor is connected to the fixed reference voltage when the switch is switched on, and wherein the pull-down resistor is disconnected from the fixed reference voltage when the switch is switched off.

8. The resistor module of claim 1,
wherein the pull-down resistor and the energy storage unit are connectable to a configuration channel (CC) port of the USB power-sourcing device.

9. The resistor module of claim 1,
wherein the energy storage unit comprises the semiconductor switch and a capacitor,
wherein the semiconductor switch is connectable to a configuration channel (CC) port of the USB power-sourcing device and is configured to store electrical energy in the capacitor in response to the current from the USB power-sourcing device.

10. The resistor module of claim 1,
wherein the pull-down resistor comprises one of a passive pull-down resistor, an active pull-down resistor, or a combination of the passive pull-down resistor and the active pull-down resistor.

11. The resistor module of claim 1,
wherein the glitch filter comprises a delay element configured to generate a delayed version of the control signal.

12. The resistor module of claim 1,
wherein the USB interface device is connectable to a USB device in a dead battery condition, and
wherein the current is applied to the resistor module and a voltage at the resistor module is detected before power is provided to the USB device.

13. A resistor module of a Universal Serial Bus (USB) cable, the resistor module comprising:
a pull-down resistor connectable to a USB host;
a switch connected between the pull-down resistor and a fixed reference voltage;
an energy storage unit connectable to the USB host and configured to store electrical energy in response to a current from the USB host;
a switch control unit connectable to the USB host through a semiconductor switch of the energy storage unit and configured to control the switch with a control signal in response to a voltage of the energy storage unit that is generated at a terminal of the semiconductor switch by comparing the voltage of the energy storage unit with a voltage threshold and
switching on or off the switch in response to a comparison result between the voltage of the energy storage unit and the voltage threshold; and
a glitch filter connected to the switch and to the switch control unit and configured to remove a glitch in the control signal.

14. The resistor module of claim 13,
wherein the USB cable comprises a USB Type-C compliant cable.

15. The resistor module of claim 13,
wherein the switch control unit is configured to turn on the switch if the voltage of the energy storage unit is higher than the voltage threshold and to turn off the switch if the voltage of the energy storage unit is lower than the voltage threshold,
wherein the pull-down resistor is connected to the fixed reference voltage when the switch is turned on, and
wherein the pull-down resistor is disconnected from the fixed reference voltage when the switch is turned off to reduce power dissipation on the resistor module.

16. The resistor module of claim 13, wherein the switch control unit comprises at least one of:
a first voltage source having a second fixed reference voltage and a voltage comparator configured to compared the second fixed reference voltage with the voltage of the energy storage unit;
a plurality of serially connected semiconductor switches connected between the energy storage unit and the fixed reference voltage; and
a current mirror circuit comprised of a first set of semiconductor switches of a first type and a second set of semiconductor switches of a second type.

17. The resistor module of claim 13,
wherein the USB cable is connectable to a USB device in a dead battery condition, and wherein the current is applied to the resistor module and a voltage at the resistor module is detected by the USB host before power is provided to the USB device.

18. A method for operating a resistor module of a Universal Serial Bus (USB) interface device, the method comprising:
storing electrical energy in response to a current from a USB power-sourcing device using an energy storage unit;
controlling a switch connected between a pull-down resistor connected to the USB power-sourcing device and a fixed reference voltage using a switch control unit connectable to the USB power-sourcing device through a semiconductor switch of the energy storage unit with a control signal in response to a voltage of the stored electrical energy that is generated at a terminal of the semiconductor switch;
removing a glitch in the control signal;
comparing the voltage of the stored electrical energy with a voltage threshold; and
switching on or off the switch in response to a comparison result between the voltage of the stored electrical energy and the voltage threshold.

19. The method of claim 18,
wherein the USB interface device comprises a USB Type-C compliant interface device.

\* \* \* \* \*